United States Patent
Oyaizu et al.

(10) Patent No.: US 7,675,039 B2
(45) Date of Patent: Mar. 9, 2010

(54) PHOSPHOR SHEET FOR RADIATION DETECTOR, RADIATION DETECTOR AND APPARATUS FOR RADIOGRAPHIC EQUIPMENT

(75) Inventors: Eiji Oyaizu, Yokohama (JP); Masami Okamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/528,661

(22) PCT Filed: Sep. 25, 2003

(86) PCT No.: PCT/JP03/12245

§ 371 (c)(1),
(2), (4) Date: Mar. 22, 2005

(87) PCT Pub. No.: WO2004/029657

PCT Pub. Date: Apr. 8, 2004

(65) Prior Publication Data

US 2006/0054830 A1      Mar. 16, 2006

(30) Foreign Application Priority Data

Sep. 26, 2002  (JP) .............................. 2002-280705

(51) Int. Cl.
   *G01T 1/20*      (2006.01)
(52) U.S. Cl. .............................. 250/370.11; 250/483.1; 250/361 R; 250/484.4; 250/582; 428/690; 252/301.18
(58) Field of Classification Search ............. 250/361 R, 250/582, 484.4, 370.11, 483.1; 428/690; 252/301.18; 427/157
See application file for complete search history.

(56) References Cited

U.S. PATENT DOCUMENTS

| | | | | |
|---|---|---|---|---|
| 4,032,791 | A | * | 6/1977 | Chiola et al. ............. 250/483.1 |
| 5,276,328 | A | | 1/1994 | Yoshida et al. |
| 5,545,899 | A | * | 8/1996 | Tran et al. .............. 250/370.09 |
| 5,562,860 | A | | 10/1996 | Grabmaier et al. |
| 5,640,016 | A | * | 6/1997 | Matsuda et al. .......... 250/361 R |
| 6,384,417 | B1 | * | 5/2002 | Okumura et al. ............ 250/367 |
| 6,392,248 | B1 | * | 5/2002 | Takahara et al. ............ 250/580 |
| 6,394,650 | B1 | * | 5/2002 | Ohara et al. ................ 378/182 |
| 6,429,430 | B2 | * | 8/2002 | Sato et al. .............. 250/363.01 |

(Continued)

FOREIGN PATENT DOCUMENTS

CN            1123305 A          5/1996

(Continued)

*Primary Examiner*—David P Porta
*Assistant Examiner*—Jessica L Eley
(74) *Attorney, Agent, or Firm*—Foley & Lardner LLP (57) ABSTRACT

A phosphor sheet 8 for a radiation detector used by being attached to a photoelectric conversion film 20 of a radiation detector 4 includes a sheet-shaped support 11, and a phosphor layer 12 provided thereon. The phosphor layer 12 contains a europium-activated rare earth oxysulfide phosphor having a europium concentration in a range of 0.01 to 3.5 mol %. The radiation detector 4 includes the phosphor sheet 8 being irradiated with radiation rays transmitted through a specimen and converting the radiation rays into light, a photoelectric conversion film 20 for converting the light from the phosphor sheet 8 into electric charges, and a charge information reading section 30 for reading out the charges generated on the photoelectric conversion film 20 for each of a plurality of pixels 31.

7 Claims, 8 Drawing Sheets

U.S. PATENT DOCUMENTS

| | | | |
|---|---|---|---|
| 6,483,122 B1 * | 11/2002 | Maezawa et al. | 250/582 |
| 6,791,091 B2 * | 9/2004 | Rodricks et al. | 250/370.09 |
| 2006/0145085 A1 * | 7/2006 | Fukuta et al. | 250/370.11 |

FOREIGN PATENT DOCUMENTS

| | | |
|---|---|---|
| DE | 44 27 021 A1 | 2/1996 |
| JP | 5-45468 A | 2/1993 |
| JP | 6-174854 A | 6/1994 |
| JP | 8-60148 A | 3/1996 |
| JP | 2000-171563 A | 6/2000 |
| JP | 2002-90460 A | 3/2002 |
| JP | 2002-196079 A | 7/2002 |
| JP | 2002-286846 A | 10/2002 |

* cited by examiner

PHOSPHOR SHEET FOR RADIATION DETECTOR, RADIATION DETECTOR AND APPARATUS FOR RADIOGRAPHIC EQUIPMENT

TECHNICAL FIELD

The present invention relates to a phosphor sheet for a radiation detector used for medical diagnosis, various kinds of non-destructive examination and the like, and an indirect conversion type radiation detector employing it and an apparatus for radiographic examination.

BACKGROUND ART

Radiography is utilized for medical diagnosis, industrial non-destructive examination and the like. An intensifying screen/film method is generally applied to radiography. The intensifying screen/film method is a method for obtaining an X-ray image by converting x-rays transmitted through a specimen into visible light by an intensifying screen, and photosensitizing a film by this visible light. Medical diagnosis, non-destructive examination and the like are carried out based on the X-ray images formed on the films.

Meanwhile, a method for performing examination by converting an X-ray image into an electric signal and performing image processing for this electric signal is becoming pervasive as a result of the advance of the digital technology in recent years. Medical diagnosis, non-destructive examination and the like are carried out based on the visible image (X-ray image) displayed on a CRT or the like. As a method for performing inspection by digitalizing an X-ray image, a method of using an X-ray image intensifier (I. I. tube) as an X-ray detector is known.

The X-ray image intensifier is provided with an input part for converting X-rays into photoelectron and an output part for converting photoelectron into visible light at both end parts of a vacuum envelop. The visible light image which is outputted is digitalized by a CCD camera or the like. For example, in the diagnosis of a lung, the image of an area of about 400×400 mm is picked up. In order to ultimately detect the examination image of such a image taken area by a CCD camera of about one inch, it is necessary to highly concentrate light in an I. I. tube. Therefore, an I. I. tube causes the problem of increasing the size of apparatus.

With the advance of the semiconductor process technology in recent years, a system for performing radiography by using semiconductor sensors and semiconductor elements arranged in an array form is developed. This kind of radiography system can easily cope with a wide-ranged image pickup area and can directly digitalize the image data. Therefore, this is suitable for putting radiographic data (image data) into database and the like in the medical field, for example. Further, it has the advantage of having a larger dynamic range as compared with the X-ray photograph system using the conventional photosensitive film so that the image accuracy is not influenced by the variation in the X-ray exposure amount.

In the radiography system utilizing the semiconductor process technology, an X-ray plane detector in which an amorphous silicon thin-film transistor (a-Si TFT) in an array form is applied to a switching gate is used. As the X-ray plane detectors, a direct conversion type using an X-ray charge conversion film for directly converting an X-ray image into electric charge information and an indirect conversion type using a phosphor layer for converting the X-ray image into an optical signal and a photoelectric conversion film for converting an optical signal into electric charge information are known (see Japanese Patent Application Laid-open No. 2002-090460, Japanese Patent Application Laid-open No. 2002-286846 and the like).

In a direct conversion type X-ray plane detector, substances which have adverse effects on a human body and environment, such as a-Se, $PbI_2$, and $HgI_2$ are used for the X-ray charge conversion film, and therefore, an indirect conversion type X-ray plane detector is being developed for commercial use. The indirect conversion type X-ray plane detector has the structure in which a fluorescence emitting part emitting light by X-rays is disposed on an optical detection part which is the combination of, for example, a photoelectric conversion film and a TFT as a switching gate. As the fluorescence emitting part, a phosphor sheet with a phosphor coated layer formed on, for example, a sheet-shaped base support is used.

A praseodymium-activated rare earth oxysulfide phosphor such as $Gd_2O_2S$: Pr, a terbium-activated rare earth oxysulfide phosphor such as $Gd_2O_2S$: Tb and the like are used for fluorescence emitting parts of such X-ray plane detectors as shown in Japanese Patent Laid-open Application No. 2002-090460 and Japanese Patent laid-open Application No. 2002-286846. They are the phosphors which are generally used for X-ray detectors due to high emission efficiency by X-rays.

However, the phosphor sheets using the conventional $Gd_2O_2S$: Pr phosphor, the $Gd_2O_2S$: Tb phosphor and the like have the problem of being incapable of sufficiently enhancing sensitivity of the X-ray detectors including photoelectric conversion films. From the above reason, in the conventional indirect conversion type X-ray plane detector, only the sensitivity equivalent to or less than the intensifier screen/film type and the image pickup system using an X-ray image intensifier (I. I. tube) can be obtained under the present circumstances. The conventional indirect conversion type X-ray plane detector can obtain only the characteristic equivalent to or less than the conventional image pickup system concerning definition of an image.

An object of the present invention is to provide a phosphor sheet for a radiation detector enhanced in the characteristic when used in combination with a photoelectric conversion film. More specifically, an object of the present invention is to provide a phosphor sheet for a radiation detector which makes it possible to enhance detection sensitivity of radiation, definition and the like of a radiation image. Another object is to provide a radiation detector and an apparatus for radiographic examination which intend to enhance accuracy, definition and the like of a radiation image by using such a phosphor sheet.

DISCLOSURE OF THE INVENTION

A first phosphor sheet for a radiation detector of the present invention is a phosphor sheet provided to be attached to a photoelectric conversion film of the radiation detector, and is characterized by comprising a support having a sheet shape, and a phosphor layer which is provided on the support and emits light by radiation rays transmitted through a specimen, and contains a rare earth oxysulfide phosphor activated by europium of concentration in a range of 0.01 mol % to 3.5 mol %.

A second phosphor sheet for a radiation detector of the present invention is a phosphor sheet provided to be attached to a photoelectric conversion film of the radiation detector, and is characterized by comprising a support having a sheet shape, and a phosphor layer which is provided on the support and emits light by radiation rays transmitted through a specimen, and has a surface that is layered on the aforesaid photoelectric conversion film, and characterized in that the surface of the phosphor layer has surface roughness of 0.5 μm or less in average roughness Ra.

A radiation detector of the present invention is characterized by the above described first or the second phosphor sheet of the present invention irradiated with the radiation rays transmitted through a specimen and converting the radiation rays into light, a photoelectric conversion film on which the phosphor sheet is layered, and which converts the light from the phosphor sheet into electric charges, and charge information reading section having a plurality of pixels in contact with the photoelectric conversion film and reading out electric charges generated on the photoelectric conversion film for each of the plurality of pixels.

An apparatus for radiographic examination of the present invention is characterized by comprising a radiation source irradiating radiation rays to a specimen, and the above described radiation detector of the present invention detecting the radiation rays transmitted through the specimen.

BEST MODE FOR CARRYING OUT THE INVENTION

A mode for carrying out the present invention will be explained hereinafter.

Figure 1:
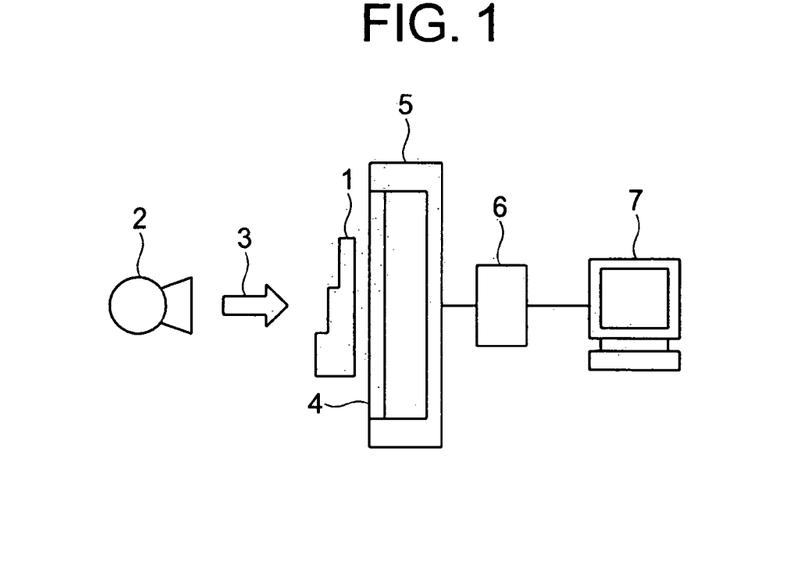
FIG. 1 is a view schematically showing a general constitution of X-ray examination apparatus as one embodiment of an radiographic examination apparatus to which a phosphor sheet for a radiation detector and a radiation detector of the present invention are applied.

FIG. 1 is a view schematically showing a constitution of X-ray examination apparatus as one embodiment of an radiographic examination apparatus to which a phosphor sheet for a radiation detector and the radiation detector of the present invention is applied. In this embodiment, the apparatus using X-rays (or y-rays) as radiation rays is mainly explained, but the present invention is not limited to this. It is possible to apply the present invention to a radiation detector and a radiographic examination apparatus using radiation rays such as β-rays and thermal neutron rays depending on an image pickup target.

In X-ray examination apparatus shown in FIG. 1, reference numeral 1 denotes a specimen such as a human body, an animal, and each of various kinds of articles, and X-rays 3 are irradiated to the specimen 1 from a radiation source such as an X-ray tube 2 or the like. The X-rays 3 which are absorbed or scattered by the specimen 1 is irradiated to an X-ray image pickup device 5 in which an X-ray plane detector 4 is incorporated. The X-rays 3 transmitted through the specimen 1 are detected as image signals in the X-ray plane detector 4. The image signals which are outputted from the X-ray image pickup device 5 are subjected to digital processing in an image processing unit 6, and thereafter, they are displayed to a display unit 7 such as a CRT as an X-ray image (examination image).

Figure 2:
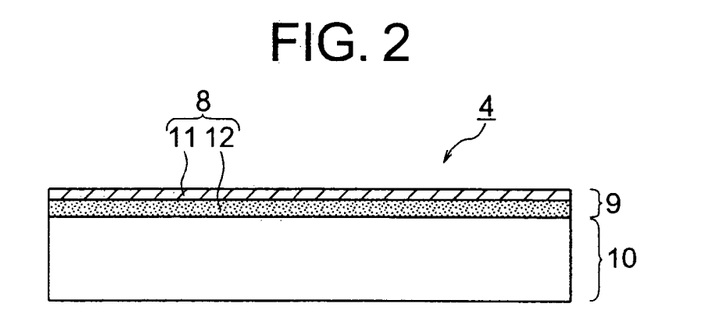
FIG. 2 is a view showing a schematic constitution of an X-ray detector used in the X-ray examination apparatus shown in FIG. 1.
Figure 3:
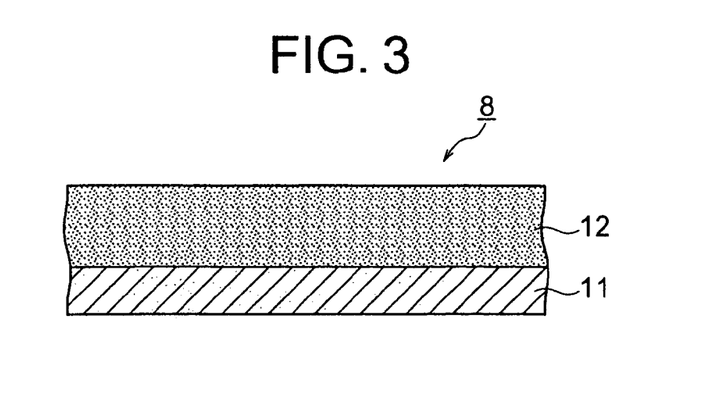
FIG. 3 is a sectional view showing a constitution of the phosphor sheet for an X-ray detector according to the first embodiment of the present invention.

The X-ray plane detector 4 is mainly constructed by a fluorescence emission part 9 including a phosphor sheet 8 and an optical detection part 10 as shown in FIG. 2. The phosphor sheet 8 has a sheet-shaped support 11 constituted of a plastic film and non-woven fabric as shown in FIG. 3. A phosphor layer 12 containing a europium (Eu) activated rare earth oxysulfide phosphor which will be described in detail later is provided on the sheet-shaped support 11 as a light-emitting layer. FIG. 3 shows a constitution of the phosphor sheet according to a first embodiment of the present invention.

A transparent protection film, for example, a protection film constituted of, for example, a polyethylene terephthalate film or the like of thickness of about several μm can be disposed on the phosphor layer 12 as necessary. In the respect of suppressing reduction or the like of definition of an X-ray image, it is preferable not to dispose the protection film on the phosphor layer 12.

As a component of the sheet-shaped support 11, for example, the component which is made by forming a resin such as polyester such as cellulose acetate, cellulose propionate, cellulose acetate butyrate and polyethylene terephthalate, polyethylene, polymethyl methacrylate, polyamide, polyimide, vinyl chloride-vinyl acetate copolymer, and polycarbonate into a film shape, paper, an aluminum sheet or the like is used.

A sheet in which a light absorption substance such as carbon black, for example, is incorporated can be used as the sheet-shaped support 11 so as to absorb light from the phosphor. Alternatively, a sheet in which a light reflection substance such as white titanium dioxide and calcium carbonate is incorporated may be applied to the sheet-shaped support 11 so as to reflect light from the phosphor. Among them, it is preferable to use the sheet-shaped support 11 which is enhanced in light reflectance by incorporating the light reflection substance therein in order to especially enhance sensitivity to X-rays.

The phosphor layer 12 is formed on the above sheet-shaped support 11 as follows, for example. First, a suitable amount of phosphor powder is mixed with a binder, to which an organic solvent is added to prepare a phosphor coating solution (phosphor slurry) with proper viscosity. This phosphor coating solution is coated on the sheet-shaped support 11 by a knife coater, a roll coater or the like and dried, and thereby, the phosphor layer 12 constituted of a layer coated with the phosphor powder (powder coated layer) is formed. It is preferable that the surface of the phosphor layer 12 has the surface roughness of 0.5 μm or less in average roughness Ra as will be described in detail in a second embodiment.

As the binder used for preparation of the phosphor coating solution, pyroxylin, cellulose acetate, ethyl cellulose, polyvinyl butyral, floccular polyester, polyvinyl acetate, vinylidenen chloride-vinyl chloride copolymer, vinyl chloride-vinyl acetate copolymer, polyalkyl (meth) acrylate, polycarbonate, polyurethane, cellulose acetate butyrate, polyvinyl alcohol and the like are cited. As the organic solvent, for example, ethanol, methyl ethyl ether, butyl acetate, ethyl acetate, ethyl ether, xylene and the like are used. A dispersant such as phthalic acid and stearic acid, and a plasticizer such as triphenyl phosphate and diethyl phthalate may be added to the phosphor coating solution as necessary.

The phosphor layer 12 in the phosphor sheet 8 is not limited to the above described layer coated with the phosphor powder (powder coated layer), but it is possible to use a planar sintered object of phosphor powder, a phosphor thin film (the phosphor formed into a film by various kinds of thin film forming techniques) and the like.

The thickness of the phosphor layer 12 is not especially limited, but it is preferable to make the thickness in the range of 80 to 300 μm. If the thickness of the phosphor layer 12 is less than 80 μm, the amount of the phosphor with respect to the thickness direction of the phosphor layer 12 becomes relatively small, and thereby, the sensitivity cannot be sufficiently obtained in some cases. If the thickness of the phosphor layer 12 exceeds 300 μm on the other hand, the sensitivity tends to lower because the light transmittance of the phosphor layer 12 becomes low, and the definition also lowers.

Figure 4:
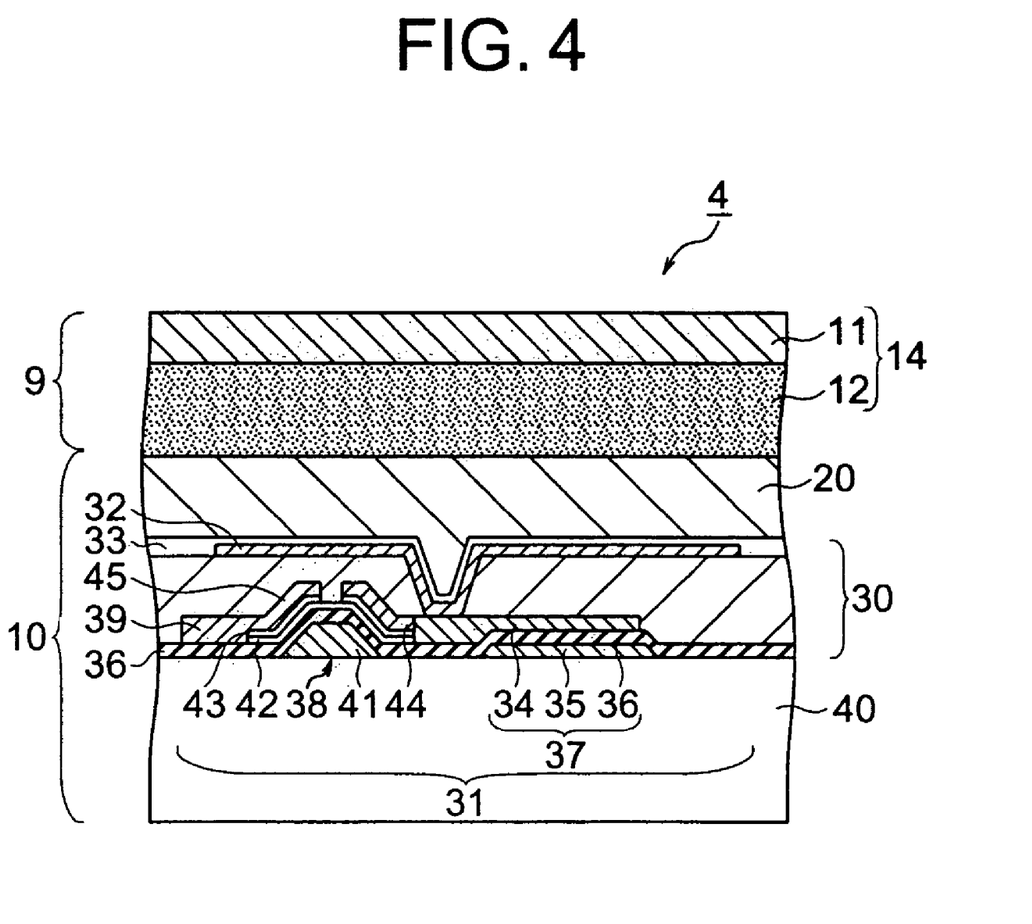
FIG. 4 is a sectional view showing a substantial part constitution of the X-ray detector shown in FIG. 2.

The above described phosphor sheet 8 is disposed by being layered on the optical detection unit 10 directly or via a transparent protection member such as a glass substrate as shown in FIG. 4. The X-ray plane detector 4 is constituted by them. Namely, the phosphor sheet 8 is bonded onto the optical detection part 10 by using an adhesive with light transmittance. The phosphor sheet 8 is provided to be integrally attached to the optical detection part 10 like this. The optical detection part 10 constituting an X-ray detector main body includes a photoelectric conversion film 20 with the phosphor sheet 8 layered thereon and a charge information reading section 30 having a plurality of pixels 31 provided to be in contact with the photoelectric conversion film 20.

Materials having photoelectric conversion action, such as, for example, amorphous silicone (a-Si) and a single crystal silicone (single crystal Si) are used as the photoelectric conversion film 20. The charge information reading section 30 has a plurality of pixels 31, and these pixels 31 are arranged in, for example an array form. Only one pixel 31 is shown in FIG. 4, but pixels are actually arranged in the state in which several hundreds to several thousands of pixels are arranged on each of the vertical and horizontal sides.

Each of the pixels 31 arranged in the array form has a pixel electrode 32 formed at the side of the photoelectric conversion film 20. A p-type contact film 33 is formed on the pixel electrode 32. The pixel electrode 32 is electrically connected to an auxiliary electrode 34. A charge storage capacitor 37 is constituted by the auxiliary electrode 34, a charge storage capacitor electrode 35 and an insulation film 36 disposed therebetween.

Each of the pixels 31 has a switching element 38, which is constituted of, for example, an amorphous silicon thin film transistor (a-Si TFT), and is provided corresponding to the charge storage capacitor 37. The optical detector part 10 of the X-ray plane detector 4 in this embodiment includes a TFT array in which such switching elements (switching TFT) 38 are formed in an array form.

The switching TFT 38 has a constitution formed by layering a gate electrode 41 electrically connected to a scanning line (not shown) for transmitting a drive signal to the TFT 38, an insulation film 36 for gate insulation, an undoped a-Si layer 42 which is used as an active layer, $n^+$ a-Si layer 43 for contact, a source electrode 44 electrically connected to the auxiliary electrode 34, and a drain electrode 45 connected to a signal line 39 in sequence on a glass substrate 40, for example.

The scanning line (not shown) and the signal line 39 are formed in an X-Y matrix shape, and the switching TFT 38 is controlled to be on/off by a scanning line drive circuit. Termination of the signal line 39 is connected to an amplifier (not shown) through a change-over switch (not shown) controlled by a signal line control circuit.

In the above described X-ray plane detector 4, the phosphor sheet 8 emits light by the X-rays transmitted through the specimen 1, and the visible light emitted from the phosphor sheet 8 is detected at the optical detection part 10. Namely, the X-rays transmitted through the specimen 1 are converted into visible light at the phosphor sheet 8 first, and the visible light is converted into electric charge at the photoelectric conversion film 20.

The electric charge converted at the photoelectric conversion film 20 is stored in the charge storage capacitor 37 via each of the pixel electrodes 32 of a plurality of pixels 31. The stored electric charges are transferred to a side of an amplifier (not shown) through the signal line 39 by turning on the switching TFT 38. Then, the charge is transferred to the side of the amplifier (not shown) for each pixel 31 by controlling on/off and the like of the switching TFT 38, and thereby, the image information of the X-ray image is converted into a dot sequential signal. Such an image signal is transmitted to the display unit 7 such as a CRT and displayed as the X-ray image (examination image) after being subjected to the digital processing in the image processing unit 6.

The X-ray plane detector 4 using the optical detection part 10 including the TFT array can easily cope with the radiography area with a large area in the medical diagnosis, for example, and provides an effect in digitalizing of the X-ray image in the medical diagnosis. The X-ray image information (examination image information) converted into a digital signal is stored as the database or the like. Such examination information stored as the database is effective when the examination information is shared by a plurality of medical institutions, for example.

Figure 5:
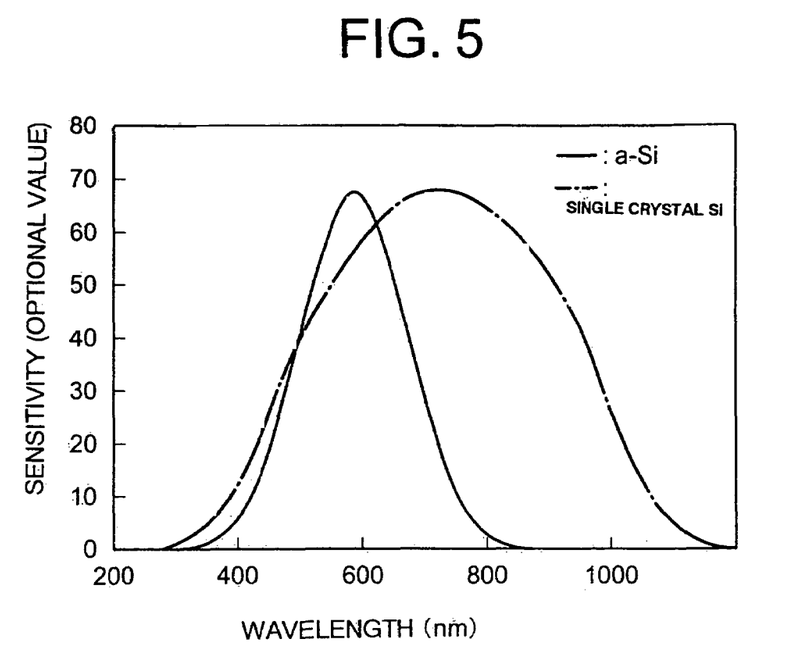
FIG. 5 is a diagram showing light reception sensitivity distribution of a photoelectric conversion film used in the X-ray detector shown in FIG. 4.

Here, the light reception sensitivity distributions of a-Si and single crystal Si used in the photoelectric conversion film 20 are shown in FIG. 5. a-Si has the broad light reception sensitivity distribution with the area in the vicinity of 600 nm as the light receiving peak, and single crystal Si has the broad light reception sensitivity distribution with the area in the vicinity of 700 nm to 800 nm as the light receiving peak. Meanwhile, the terbium-activated rare earth oxysulfide phosphor such as $Gd_2O_2S$:Tb is conventionally used for the phosphor which converts X-rays into visible light. This respect is as described above.

Figure 6:
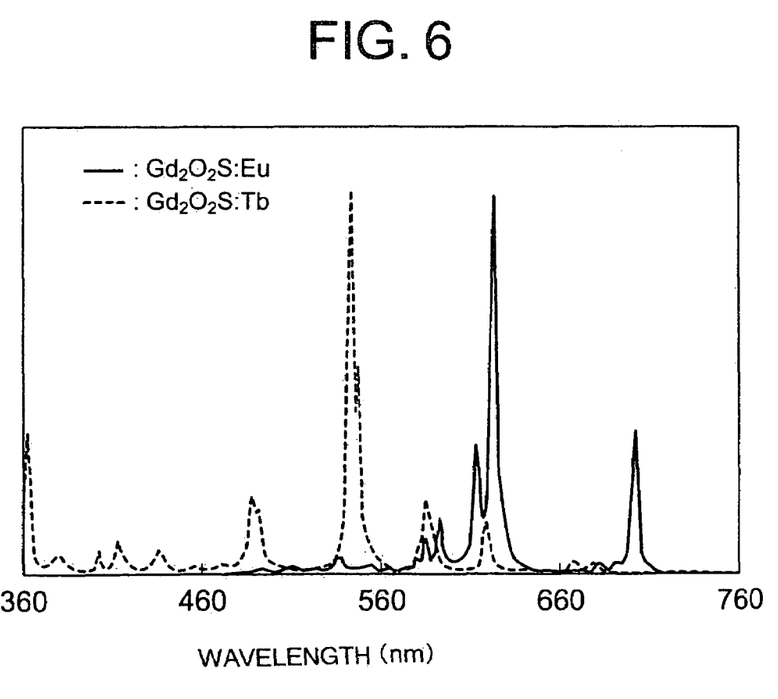
FIG. 6 is a diagram showing emission spectrum of a $Gd_2O_2S$: Eu phosphor in comparison with a $Gd_2O_2S$: Tb phosphor.

In the terbium-activated rare earth oxysulfide phosphor which is used for the conventional fluorescence generating part, the main light emitting component exists in the vicinity of 540 nm as its light emission spectrum is shown by the dotted line in FIG. 6. Therefore, it has poor matching with the light reception sensitivity distribution of the photoelectric conversion film 20 constituted of a-Si and single crystal Si, and this is considered to be the reason of reduction in the sensitivity characteristic in the conventional X-ray plane detector.

In order to enhance the sensitivity characteristic of the X-ray, plane detector 4, it is important to use a light emitter having a emission spectrum corresponding to the light reception sensitivity distribution of the photoelectric conversion film 20 constituted of a-Si and single crystal Si for the phosphor sheet 8 for converting the X-rays transmitted through the specimen 1 into visible light. Thus, in the phosphor sheet 8 of the first embodiment, a europium-activated rare earth oxysulfide phosphor is used as the phosphor having the emission spectrum matched with the light reception sensitivity distributions of a-Si and single crystal Si shown in FIG. 5.

As the europium (Eu)-activated rare earth oxysulfide phosphor, the phosphor having the composition substantially expressed by General formula: $(R_{1-a}Eu_a)_sO_sS$     (1)

(In the formula, R expresses at least one kind of element which is selected from Gd, Lu, Y and La, and a denotes the number which satisfies $1 \times 10^{-4} \leq a \leq 3.5 \times 10^{-2}$) is cited. It is especially preferable to use a europium-activated oxysulfide gadolinium ($Gd_2O_2S$:Eu) phosphor with excellent X-ray absorbing efficiency and emission efficiency, and a europium-activated oxysulfide lutetium ($Lu_2O_2S$:Eu) phosphor with excellent X-ray absorbing efficiency.

Figure 7:
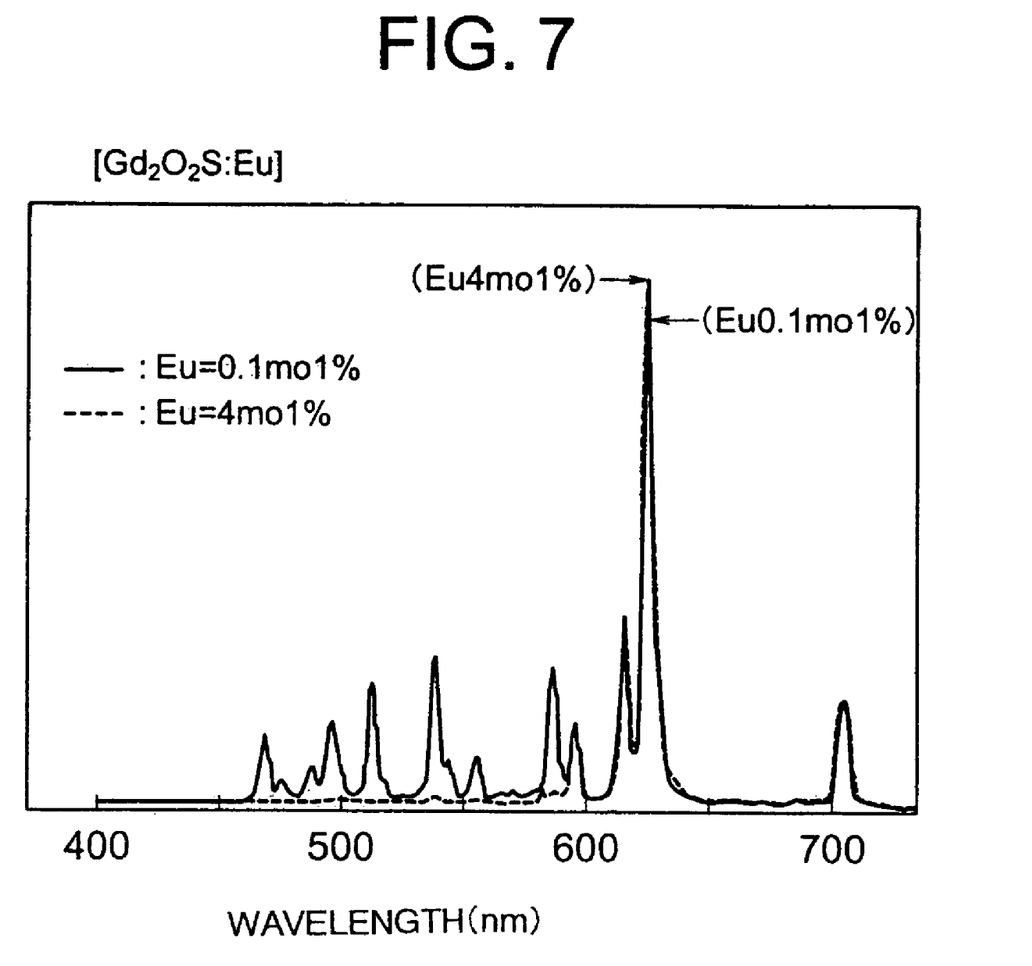
FIG. 7 is a diagram showing emission spectrum according to the Eu concentration of the $Gd_2O_2S$: Eu phosphor.

As for the emission spectrum of the europium-activated rare earth oxysulfide phosphor, the main emission component exists in the vicinity of 630 nm and is found out from the emission spectrum of the $Gd_2O_2S$:Eu phosphor shown by the solid line in FIG. 6. Therefore, as compared with the conventional terbium-activated rare earth oxysulfide phosphor, it is excellent in matching characteristic with the light reception sensitivity distribution of the photoelectric conversion film 20 constituted of a-Si and single crystal Si. Further, as shown in FIG. 7, in the europium-activated rare earth oxysulfide phosphor, the emission spectrum changes in accordance with Eu concentration (activator concentration), and the sensitivity characteristic of the X-ray plane detector 4 can be enhanced by controlling the Eu concentration.

Namely, when the Eu concentration becomes small, the intensity of the main emission component (630 nm) becomes small, but the intensity of the auxiliary emission component of 450 to 600 nm becomes large. The solid line in FIG. 7 shows the emission spectrum of the $Gd_2O_2S$:Eu phosphor with Eu concentration of 0.1 mol %, and the dotted line shows the emission spectrum of the $Gd_2O_2S$:Eu phosphor with the Eu concentration of 4 mol %. The sensitivity characteristic of the X-ray plane detector 4 is determined by the correlation of the light reception sensitivity distribution of the photoelectric conversion film 20 and the emission spectrum of the phosphor constituting the phosphor layer 12 of the phosphor sheet 8. Accordingly, when the amount of increase of the auxiliary emission component becomes larger than the decrease amount of the main emission component due to decrease of the Eu concentration, and the light amount of the auxiliary emission component in consideration of the light reception sensitivity of the photoelectric conversion film 20 in each wavelength region, the sensitivity is enhanced.

From the above reasons, the phosphor layer 12 of the phosphor sheet 8 is constituted of the europium-activated rare earth oxysulfide phosphor with the Eu concentration in the range of 0.01 to 3.5 mol %. When the Eu concentration of the europium-activated rare earth oxysulfide phosphor exceeds 3.5 mol %, the intensity of the auxiliary emission component of 450 to 600 nm becomes small, and the sensitivity characteristic cannot be sufficiently enhanced. When the Eu concentration is less than 0.01 mol % on the other hand, the emission intensity itself becomes so low that the sensitivity characteristic is reduced.

It is preferable that the Eu concentration of the europium-activated rare earth oxysulfide phosphor is in the range of 0.1 to 2.0 mol % which is especially excellent in the matching characteristic of the emission intensity and the photoelectric conversion film 20, and the range of 0.2 mol % to 1.6 mol % is more preferable. The Eu concentration of the rare earth oxysulfide phosphor can be quantatively analyzed by the ICP mass spectrometry, ICP optical emission spectrochemical analysis, and the like.

It is preferable to compose the phosphor layer 12 of the phosphor sheet 8 of the rare earth oxysulfide phosphor powder with the average particle size in the range of 2 to 15 μm in consideration of the sensitivity and definition. When the average particle size of the rare earth oxysulfide phosphor powder exceeds 15 μm, the graininess of the obtained image becomes worse and definition lowers. When the average particle size of the rare earth oxysulfide phosphor powder is less than 2 μm on the other hand, light-emission luminance lowers and the sensitivity characteristic becomes worse though the definition is enhanced. It is more preferable that the average particle size of the rare earth oxysulfide phosphor powder is in the range of 6 to 10 μm.

The phosphor layer 12 of the phosphor sheet 8 does not always have to be constituted of the europium-activated rare earth oxysulfide phosphor by itself, but the phosphor layer 12 may be formed of a mixture with a terbium-activated rare earth oxysulfide phosphor such as $Gd_2O_2S$:Tb, for example. However, in the case of using such mixed phosphors, the europium-activated rare earth oxysulfide phosphor should be used at a rate of 50% by mass or more. When the rate of the europium-activated rare earth oxysulfide phosphor is less than 50% by mass, the effect of enhancement of the sensitivity characteristic as described above cannot be obtained sufficiently.

As described above, the phosphor sheet 8 for an X-ray detector according to the first embodiment uses the europium-activated rare earth oxysulfide phosphor which is high in light emission efficiency when X-rays are irradiated, and has the emission spectrum matched with the light reception sensitivity distribution of the photoelectric conversion film 20 constituted of a-Si and single crystal Si. Accordingly, the sensitivity characteristic of the X-ray plane detector 4 constituted by combining the phosphor sheet 8 and the photoelectric conversion film 20 can be effectively enhanced.

According to the X-ray examination apparatus 5 using the above X-ray plane detector 4, it becomes possible to enhance the image accuracy of the medical radiography and examination accuracy in addition to achieving reduction in radioactive dose of X-rays in the medical diagnosis, for example. The X-ray examination apparatus 5 using the X-ray plane detector 4 exhibits the effects in digitalization of the X-ray image information in the medical diagnosis as described above, and in making the X-ray image information (examination image information) the database and the like. The X-ray examination apparatus 5 using the X-ray plane detector 4 is not limited to the use for medical diagnosis but is also applicable to the non-destructive examination for industrial use and the like.

Figure 8:
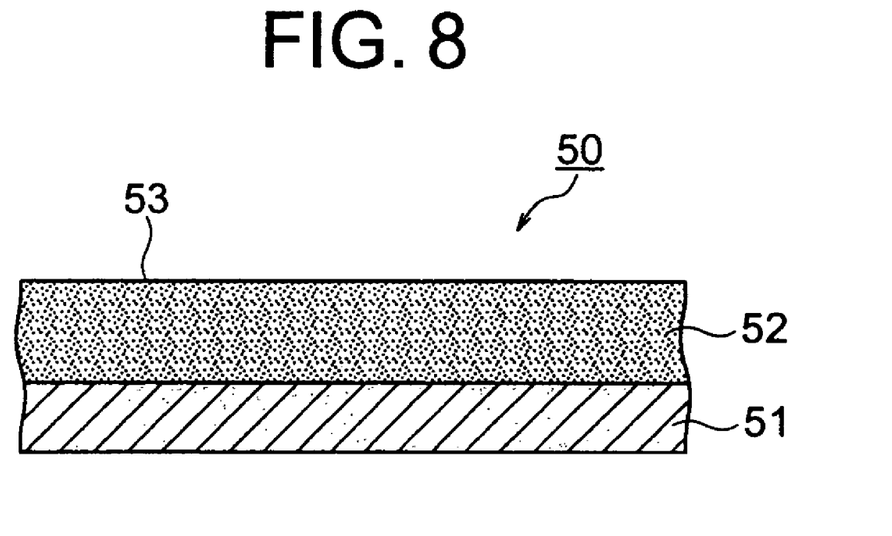
FIG. 8 is a sectional view showing a constitution of a phosphor sheet for an X-ray detector according to a second embodiment of the present invention.

Next, a phosphor sheet for a radiation (X-ray) detector according to a second embodiment of the present invention will be explained with reference to FIG. 8. A phosphor sheet 50 shown in FIG. 8 includes a sheet-shaped support 51 constituted of a plastic film, unwoven-cloth and the like, and a phosphor layer 52 formed on this sheet-shaped support 51 as in the first embodiment shown in FIG. 3. The constitution of the sheet-shaped support 51 is the same as that in the first embodiment described above.

Figure 9:
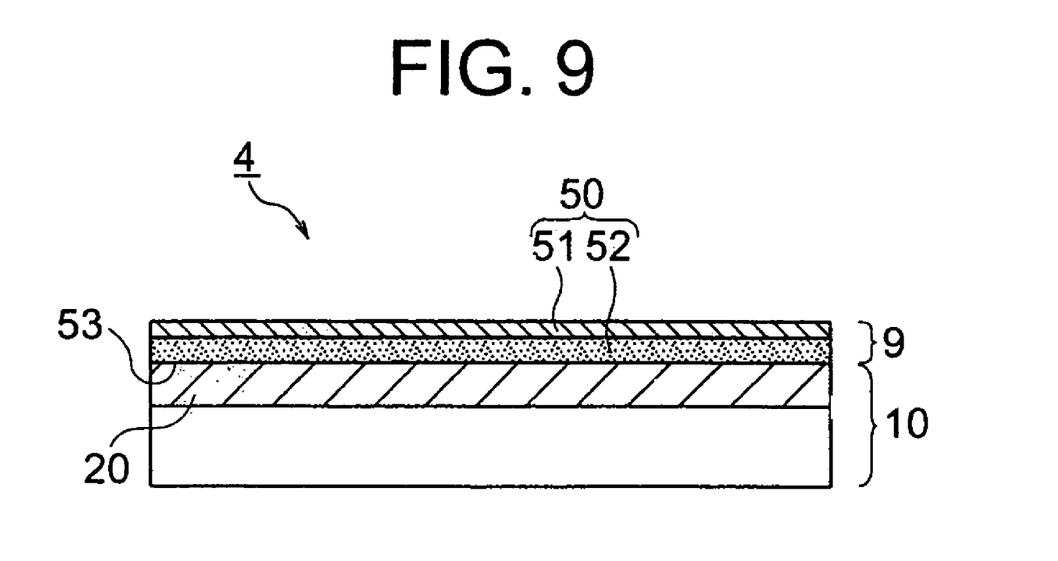
FIG. 9 is a sectional view showing a schematic constitution of the X-ray detector using the phosphor sheet for the X-ray detector shown in FIG. 8.

The phosphor sheet 50 is disposed by being layered on the optical detection part 10 constituting the X-ray detector main body directly or via a transparent protection member such as a glass substrate as shown in FIG. 2. Namely, the phosphor layer 52 of the phosphor sheet 50 has a surface 53 on which the photoelectric conversion film 20 of the optical detection part 10 is layered as shown in FIG. 9. In other words, the surface 53 of the phosphor layer 52 constitutes an interface of the phosphor layer 52 and the photoelectric conversion film 20. Accordingly, in converting light emitted at the phosphor layer 52 into electric charge in the photoelectric conversion film 20, the state of the surface 53 of the phosphor layer 52 constituting the interface is important.

Namely, if relatively large irregularities occur to the surface 53 of the phosphor layer 52, the light emitted at the phosphor layer 52 scatters when incident on the photoelectric conversion film 20, and definition of the X-ray image is lowered. Scattering of light by the surface 53 of the phosphor layer 52 becomes the factor of lowering sensitivity. Further, part of the light emitted at the phosphor layer 52 is reflected at the surface of the photoelectric conversion film 20. When relatively large irregularities occur to the surface 53 of the phosphor layer 52, the reflected light is diffused on the surface 53 of the phosphor layer 52. This also becomes the factor of lowering definition and sensitivity.

Thus, in the phosphor sheet 50 of the second embodiment, the surface roughness of the surface 53 of the phosphor layer 52 is controlled to be 0.5 µm or less in the average roughness Ra. Here, the average roughness Ra complies with the standard of JIS B 0601-1994. The average roughness Ra is the value obtained as follows in concrete. The curved obtained by removing the surface waviness components which are longer than the predetermined wavelength from the profile curve obtained from a cut surface when the measuring surface is cut by the plane perpendicular to the measuring surface by a phase-compensating type high-pass filter is set as a roughness curve f (x). The average roughness is the value of the result that the roughness curve is extracted by the reference length L in the direction of the average line, and the absolute values of the deviations from the average line of this extracted portion to the measured curve are totaled and averaged.

The average roughness Ra of the surface 53 of the phosphor layer 52 in the phosphor sheet 50 shows the value which is measured as follows in concrete. First, the phosphor sheet 50 is fixed on a horizontal table, and the average roughness Ra of at least three spots is measured by using a surface roughness tester (S4C made by Taylor Hobson Ltd.). The measurement positions and the measuring direction of the average roughness are random. The average roughness Ra of at least three spots measured in this manner is averaged. This averaged value is set as the average roughness Ra of the surface 53 of the phosphor layer 52.

By setting the surface roughness of the surface 53 of the phosphor layer 52 at 0.5 µm or less in the average roughness Ra in this manner the light emitted at the phosphor layer 52 is difficult to scatter when incident on the photoelectric conversion film 20, and therefore, it becomes possible to enhance definition of the X-ray image. Further, when part of the light emitted at the phosphor layer 52 is reflected on the surface of the photoelectric conversion film 20, the reflected light can be incident on the photoelectric conversion film 20 without scattering this reflected light. By these things, the definition and detection sensitivity of the X-ray image can be enhanced. It is more preferable to set the surface roughness of the phosphor layer 52 at 0.3 µm or less in the average roughness Ra.

The phosphor layer 52 with the average roughness Ra of the surface 53 at 0.5 µm or less can be obtained by forming the phosphor layer by the aforementioned coating method of the phosphor slurry, and thereafter performing smoothing treatment for its surface by using a metal roll or a metal plate. The smoothing treatment is carried out by, for example, passing the sheet with the phosphor layer formed thereon between two metal rolls, or pressing the sheet by sandwiching the sheet with two metal plates, or the like. The surface roughness of the phosphor layer 52 which is a powder coated layer tends to have the minimum value of about 0.1 µm in the average roughness Ra even if the smoothing treatment is performed, but it goes without saying that the surface roughness may be less than this.

In setting the surface roughness Ra of the surface 53 of the phosphor layer 52 at less than 0.5 µm, it is preferable to set the filling factor of the phosphor particles in the phosphor layer 52 in the range of 60 to 80%. It is also preferable that the phosphor particles constituting the phosphor layer 52 each have the average particle size in the range of 2 to 15 µm. Here, the phosphor filling factor P of the phosphor layer 52 is the value obtained based on the following formula.

$$P = Vp/V = W/V/\rho p$$

(In the formula, Vp is the volume of the phosphor, V is the volume of the phosphor layer, W is the mass of the phosphor, and ρp is the density of the phosphor).

When the filling factor of the phosphor particles in the phosphor layer 52 is low, the spaces between the adjacent phosphor particles become large. The spaces between the phosphor particles on the surface 53 of the phosphor layer 52 also become large, and therefore, the irregularities on the surface 53 become large. For this reason, it is preferable to set the filling factor of the phosphor particles in the phosphor layer 52 is set at 60% or more. When the filling factor of the phosphor particles in the phosphor layer 52 exceeds 80% on the other hand, it becomes difficult to keep the phosphor layer 52 which is the powder coated layer. It is more preferable to set the filling factor of the phosphor particles in the range of 65 to 75%.

When the average particle size of the phosphor particle in the phosphor layer 52 is too large, the gaps between the adjacent phosphor particles become deep, and thus, the irregularities on the surface 53 become large. From this respect, it is preferable to set the average particle size of the phosphor particle in the phosphor layer 52 at 15 μm or less. When the average particle size of the phosphor particle is less than 2 μm on the other hand, the light-emission luminance of the phosphor layer 52 tends to be lowered as described above. Namely, it is preferable that the average particle size of the phosphor particle constituting the phosphor layer 52 is in the range of 2 to 15 μm.

In the phosphor sheet 50 of the second embodiment, it is preferable to use a europium-activated rare earth oxysulfide phosphor ($Gd_2O_2S$: Eu phosphor, $Lu_2O_2S$: Eu phosphor and the like) for the phosphor constituting the phosphor layer 52, as in the first embodiment described above. However, it is also possible to apply the phosphor layer 52 constituted of other phosphors to the phosphor sheet 50 of the second embodiment. In such a case, the definition and the like of the X-ray image is enhanced by preventing the above described scattering and diffusion of light.

As the phosphor constituting the phosphor layer 52, phosphors of $CaWO_4$, $YTaO_4$, $YTaO_4$:Nb, $YTaO_4$:Tm, LaOBr: Tm, $BaSO_4$:Pb, ZnS:Ag, $BaSO_4$:Eu, BaFCl:Eu, BaF (Br, I):Eu, $R_2O_2X$:Y (R is at least one of element selected from Y, La, Gd and Lu, X is at least one of element selected from S, Se and Te, and Y is at least one of element selected from Tb and Eu), and the like are cited, and these phosphors can be used by itself or in combination. It is preferable that the other materials (binders and the like) constituting the phosphor layer 52 are the same as the aforementioned first embodiment.

The phosphor sheet 50 of the second embodiment constitutes the X-ray detector 4 by being layered on the photoelectric conversion film 20 of the optical detection part 10. The concrete constitution of the X-ray detector 4 is as shown in FIG. 4. Further, the X-ray detector 4 using the phosphor sheet 50 of the second embodiment is applied to the X-ray examination apparatus as shown in FIG. 1, and the constitution of the X-ray examination apparatus is as shown in FIG. 1.

In the above described embodiments, the example in which the radiation detector of the present invention is applied to the X-ray plane detector (the one with a plurality of pixels 31 each having the switching TFT 38 arranged in an array form) is explained. The radiation detector of the present invention is not limited, but can be applied to an X-ray detector in which a plurality of pixels 31 each having the switching TFT 38 are arranged in a line form, a so-called line sensor or the like.

Next, concrete examples of the present invention and their evaluation results will be described.

EXAMPLE 1

The $Gd_2O_2S$: Eu phosphor (Eu concentration 0.5 mol %) of the average particle size of 8 μm was prepared. 1 part by weight of polyvinyl butyral resin as a binder and a proper amount of ethyl acetate as an organic solvent were mixed into 10 parts by weight of $Gd_2O_2S$: Eu phosphor powder, and thereby, the phosphor coating solution was prepared. This phosphor coating solution was uniformly coated on the sheet base material constituted of the white polyethylene terephthalate film (containing titanium dioxide) of 400 mm long, 300 mm broad and 250 μm thick by the knife coater so that the coating mass of the phosphor becomes 900 g/m$^2$ (90 mg/cm$^2$) and the coating film thickness becomes about 200 μm, and dried, and thereby, the phosphor layer was formed. The phosphor sheet thus obtained was submitted to the characteristic evaluation which will be described later.

EXAMPLE 2

The phosphor sheet was produced as in Example 1 except that the $Lu_2O_2S$: Eu phosphor of the Eu concentration of 0.5 mol % was used instead of the phosphor in example 1. The phosphor sheet using this $Lu_2O_2S$: Eu phosphor was submitted to the characteristic evaluation which will be described later.

COMPARATIVE EXAMPLE 1

The phosphor sheet was produced as in Example 1 except that the $Gd_2O_2S$: Tb phosphor of the Tb concentration of 0.5 mol % was used instead of the phosphor of example 1. The phosphor sheet using this $Gd_2O_2S$: Tb phosphor was submitted to the characteristic evaluation which will be described later.

Each of the phosphor sheets of the aforementioned Examples 1 and 2 and Comparative Example 1 was layered on the X-ray detector main body having the photoelectric conversion film constituted of a-Si (the one with the photoelectric conversion film formed on each of the optical detection parts 10/TFT arrays shown in FIG. 2 and FIG. 4) and bonded, and thereby, each of the x-ray plane detectors 4 shown in FIG. 2 and FIG. 4 was prepared. The optical detection part 10 including the TFT array has the same area as the phosphor sheet. The radiographic system shown in FIG. 1 was constructed by using such an X-ray plane detector 4, and the sensitivity characteristic at the time of X-ray irradiation and the definition characteristic were measured and evaluated. These measurement results are shown in Table 1. The sensitivity and definition in Table 1 are the relative values when the measurement result of Comparative Example 1 is set as 100.

TABLE 1

| | PHOSPHOR | | | |
|---|---|---|---|---|
| | COMPO-SITION | ACTIVATOR CONCEN-TRATION (mol %) | RELATIVE SENSI-TIVITY | RELATIVE DEFINI-TION |
| EXAMPLE 1 | $Gd_2O_2S$: Eu | Eu = 0.5 | 120 | 100 |
| EXAMPLE 2 | $Lu_2O_2S$: Eu | Eu = 0.5 | 119 | 105 |
| COMPARA-TIVE EXAMPLE 1 | $Gd_2O_2S$: Tb | Tb = 0.5 | 100 | 100 |

As is obvious from Table 1, the phosphor sheets using the $Gd_2O_2S$: Eu phosphor and the $Lu_2O_2S$: Eu phosphor are excellent in the sensitivity characteristic when used in combination with the photoelectric conversion films constituted of a-Si as compared with the phosphor sheet using the conventional $Gd_2O_2S$:Tb phosphor.

EXAMPLES 3 AND 4

The phosphor sheets were produced similarly to Example 1 except that the $Gd_2O_2S$: Eu phosphor of the Eu concentration of 0.01 mol % (example 3) and the $Gd_2O_2S$: Eu phosphor of the Eu concentration of 3.5 mol % (example 4) were used instead of the phosphor in example 1. The sensitivity and the definition of these phosphor sheets were measured similarly to Example 1. The results are shown in Table 2. The sensitivities and definitions in Table 2 are the relative values when the measurement result of Comparative Example 1 is set as 100.

COMPARATIVE EXAMPLES 2 AND 3

The phosphor sheets were produced similarly to Example 1 except that the $Gd_2O_2S$: Eu phosphor of the Eu concentration of 0.005 mol % (Comparative example 2) and the $Gd_2O_2S$: Eu phosphor of the Eu concentration of 7.5 mol % (Comparative example 3) were used instead of the phosphor in Example 1. The sensitivity and the definition of these phosphor sheets were measured similarly to example 1. The results are shown in Table 2. The sensitivities and definitions in Table 2 are the relative values when the measurement result of Comparative Example 1 is set as 100. The relationship between the Eu concentration and sensitivity of the $Gd_2O_2S$: Eu phosphor is shown in FIG. 10.

TABLE 2

| | PHOSPHOR | | | |
|---|---|---|---|---|
| | COMPO-SITION | ACTIVATOR CONCEN-TRATION (mol %) | RELATIVE SENSI-TIVITY | RELATIVE DEFINI-TION |
| EXAMPLE 1 | $Gd_2O_2S$: Eu | Eu = 0.5 | 120 | 100 |
| EXAMPLE 3 | $Gd_2O_2S$: Eu | Eu = 0.01 | 103 | 101 |
| EXAMPLE 4 | $Gd_2O_2S$: Eu | Eu = 3.5 | 105 | 100 |
| COMPARATIVE EXAMPLE 1 | $Gd_2O_2S$: Tb | Tb = 0.5 | 100 | 100 |
| COMPARATIVE EXAMPLE 2 | $Gd_2O_2S$: Eu | Eu = 0.005 | 95 | 99 |
| COMPARATIVE EXAMPLE 3 | $Gd_2O_2S$: Eu | Eu = 7.5 | 94 | 100 |

Figure 10:
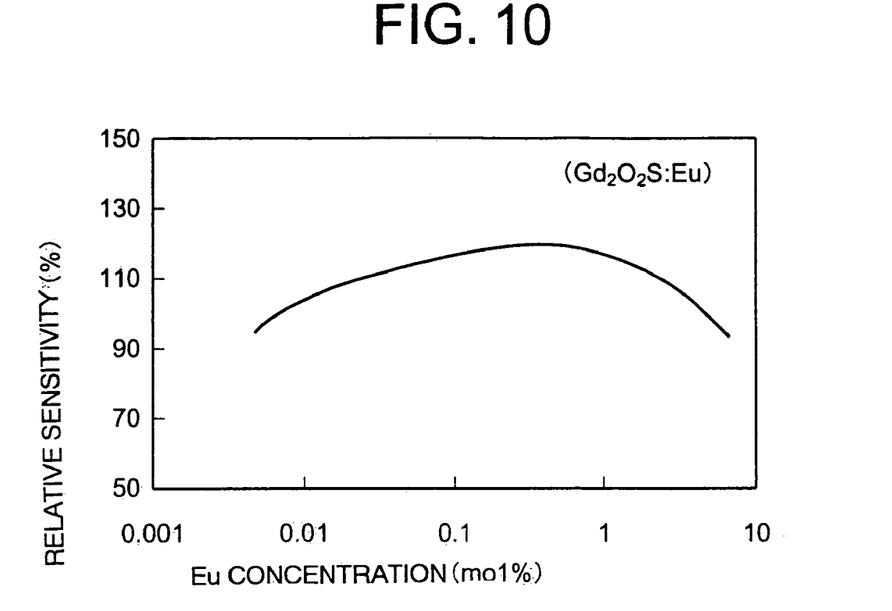
FIG. 10 is a diagram showing relationship between the Eu concentration of the $Gd_2O_2S$: Eu phosphor and sensitivity of the phosphor sheet according to one example of the present invention.

As is obvious from Table 2 and FIG. 10, according to the phosphor sheet using the $Gd_2O_2S$: Eu phosphor with Eu concentration controlled in the range of 0.01 to 3.5 mol %, the sensitivity characteristic when used in combination with the photoelectric conversion film constituted of a-Si can be enhanced with good reproduciability. It has been confirmed that the same tendency is shown in the case of using $Lu_2O_2S$: Eu phosphor.

EXAMPLES 5 TO 8

The phosphor sheets were produced similarly to Example 1 except that the $Gd_2O_2S$: Eu phosphor of the average particle size of 2 μm (Example 5), the $Gd_2O_2S$: Eu phosphor of the average particle size of 15 μm (Example 6), the $Gd_2O_2S$: Eu phosphor of the average particle size of 0.5 μm (Example 7), and the $Gd_2O_2S$: Eu phosphor of the average particle size of 25 μm (Example 8) were used instead of the phosphor in Example 1. Each Eu concentration of these phosphors is 0.5 mol %.

Figure 11:
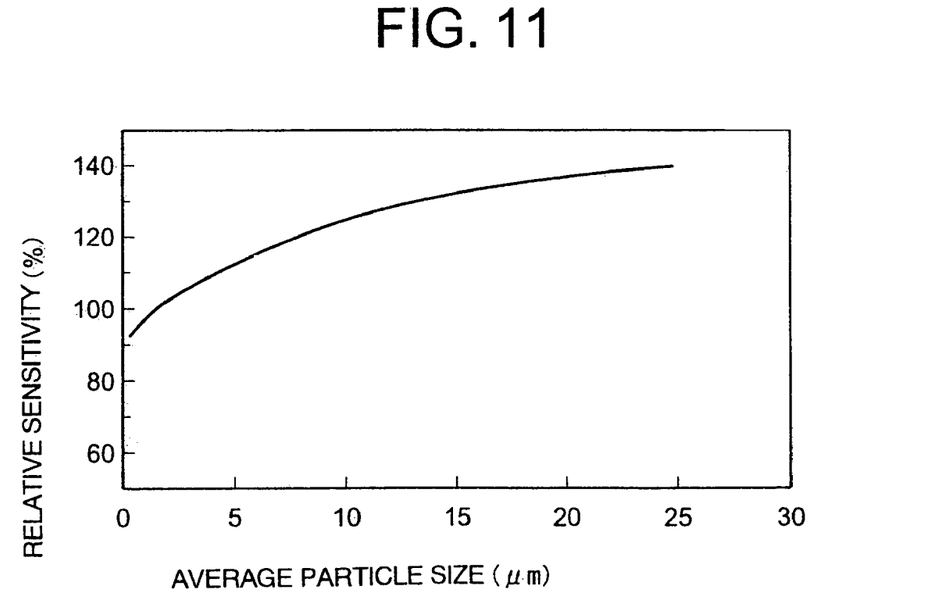
FIG. 11 is a diagram showing relationship between the average particle size of the $Gd_2O_2S$: Eu phosphor and the sensitivity of the phosphor sheet according to one example of the present invention.
Figure 12:
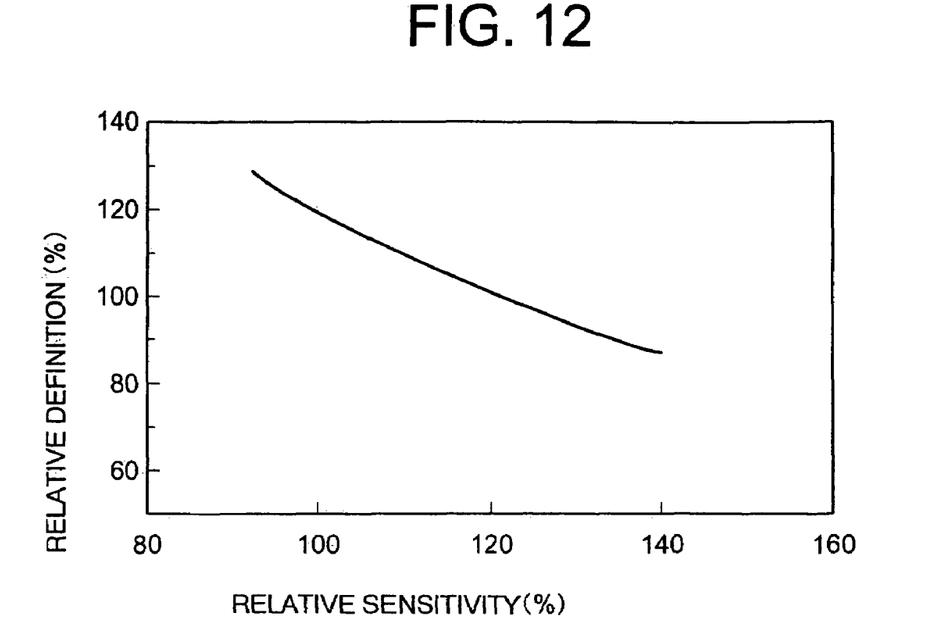
FIG. 12 is a diagram showing relationship between the sensitivity and definition of the phosphor sheet according to one example of the present invention.

The sensitivity and the definition of these phosphor sheets were measured similarly to Example 1. The results are shown in Table 3. The sensitivities and definitions in Table 3 are the relative values when the measurement result of Comparative Example 1 is set as 100. The relationship between the average particle size of the $Gd_2O_2S$: Eu phosphor and sensitivity is shown in FIG. 11, and the relationship between the sensitivity and the definition is shown in FIG. 12.

TABLE 3

| | PHOSPHOR | | | | |
|---|---|---|---|---|---|
| | COMPOSITION | ACTIVATOR CONCENTRATION (mol %) | AVERAGE PARTICLE SIZE (μm) | RELATIVE SENSITIVITY | RELATIVE DEFINITION |
| EXAMPLE 1 | $Gd_2O_2S$: Eu | Eu = 0.5 | 8 | 120 | 100 |
| EXAMPLE 5 | $Gd_2O_2S$: Eu | Eu = 0.5 | 2 | 102 | 118 |
| EXAMPLE 6 | $Gd_2O_2S$: Eu | Eu = 0.5 | 15 | 133 | 90 |
| EXAMPLE 7 | $Gd_2O_2S$: Eu | Eu = 0.5 | 0.5 | 92 | 129 |
| EXAMPLE 8 | $Gd_2O_2S$: Eu | Eu = 0.5 | 25 | 140 | 87 |
| COMPARATIVE EXAMPLE 1 | $Gd_2O_2S$: Tb | Tb = 0.5 | 8 | 100 | 100 |

As is obvious from Table 3, it is found out that it is preferable to set the average particle size of Gd$_2$O$_2$S: Eu phosphor in the range of 2 to 15 μm from the sensitivity/definition tradeoffs. This respect is also obvious from FIG. 11 and FIG. 12. Sensitivity is enhanced as the average particle size of the phosphor is made larger (FIG. 11). On the other hand, definition lowers with rise in sensitivity (increase in the average particle size) (FIG. 12), and therefore it is preferable to set the average particle size of the europium-activated rare earth oxysulfide phosphor in the range of 2 to 15 μm in consideration of both characteristics of sensitivity and definition.

However, when it is desired to further enhance sensitivity even at sacrifice of definition to some extent, such a phosphor as shown in example 8 can be used. When it is desired to further enhance definition even at sacrifice of sensitivity to some extent, such a phosphor as shown in example 7 can be used.

EXAMPLE 9

The Gd$_2$O$_2$S: Eu phosphor (Eu concentration=0.5 mol %) of the average particle size of 8 μm was prepared. 0.5 parts by weight of polyvinyl butyral resin as a binder and a proper amount of methyl ethyl ketone as an organic solvent were mixed into 10 parts by weight of Gd$_2$O$_2$S: Eu phosphor powder, and thereby, the phosphor coating solution was prepared. This phosphor coating solution was uniformly coated on the sheet base material constituted of the white polyethylene terephthalate film of 400 mm long, 300 mm broad and 250 μm thick by the knife coater so that the coating mass of the phosphor becomes 900 g/m$^2$ (90 mg/cm$^2$) and the coating film thickness becomes about 200 μm, and dried.

Next, the sheet having the coated layer of the phosphor was pressed by being held by two metal sheets with smooth surfaces, and thereby, the intended phosphor layer was formed. The average roughness Ra of the surface of the phosphor layer thus obtained was 0.28 μm. The phosphor filling factor of the phosphor layer was 69%. Such a phosphor sheet was submitted to the characteristic evaluation which will be described later.

EXAMPLES 10 TO 13

The phosphor sheets were produced similarly to example 9 except that the adding amount of the binder, the conditions of the smoothing treatment of the phosphor layer surface and the like were changed in the above described Example 9. The average roughness Ra of the surface of each of these phosphor sheets is as shown in Table 4. Each of such phosphor sheets was submitted to the characteristic evaluation which will be described later.

REFERENCE EXAMPLES 1 AND 2

The phosphor sheets were produced similarly to Example 9 except that the adding amount of the binder and the conditions of smoothing treatment of the phosphor layer surface and the like were changed in the above described Example 9. The average roughness Ra of the surface of each of these phosphor sheets and the phosphor filing factors are as shown in Table 4. Each of such phosphor sheets was submitted to the characteristic evaluation which will be described later.

The sensitivity characteristic and the definition characteristic of each of the phosphor sheets of the aforementioned Examples 9 to 13 and Reference Examples 1 and 2 were measured and evaluated similarly to the aforementioned Example 1. These measurement results are shown in Table 4. The sensitivities and definitions in Table 4 are the relative values when the measurement result in reference example 1 is set as 100. The relationship between the average roughness Ra of the surface of the phosphor layer and relative definition is shown in FIG. 13, and the phosphor filling factor of the phosphor layer and relative definition is shown in FIG. 14.

TABLE 4

| | PHOSPHOR LAYER | | | | |
|---|---|---|---|---|---|
| | SURFACE ROUGHNESS Ra (μm) | PHOSPHOR FILLING FACTOR (%) | PHOSPHOR PARTICLE AVERAGE PARTICLE SIZE (μm) | RELATIVE SENSITIVITY | RELATIVE DEFINITION |
| EXAMPLE 9 | 0.28 | 69 | 8 | 101 | 109 |
| EXAMPLE 10 | 0.10 | 72 | 8 | 99 | 110 |
| EXAMPLE 11 | 0.50 | 65 | 8 | 100 | 105 |
| EXAMPLE 12 | 0.30 | 60 | 8 | 99 | 105 |
| EXAMPLE 13 | 0.22 | 80 | 8 | 100 | 112 |
| REFERENCE EXAMPLE 1 | 0.72 | 69 | 8 | 100 | 100 |
| REFERENCE EXAMPLE 2 | 0.28 | 55 | 8 | 99 | 100 |

Figure 13:
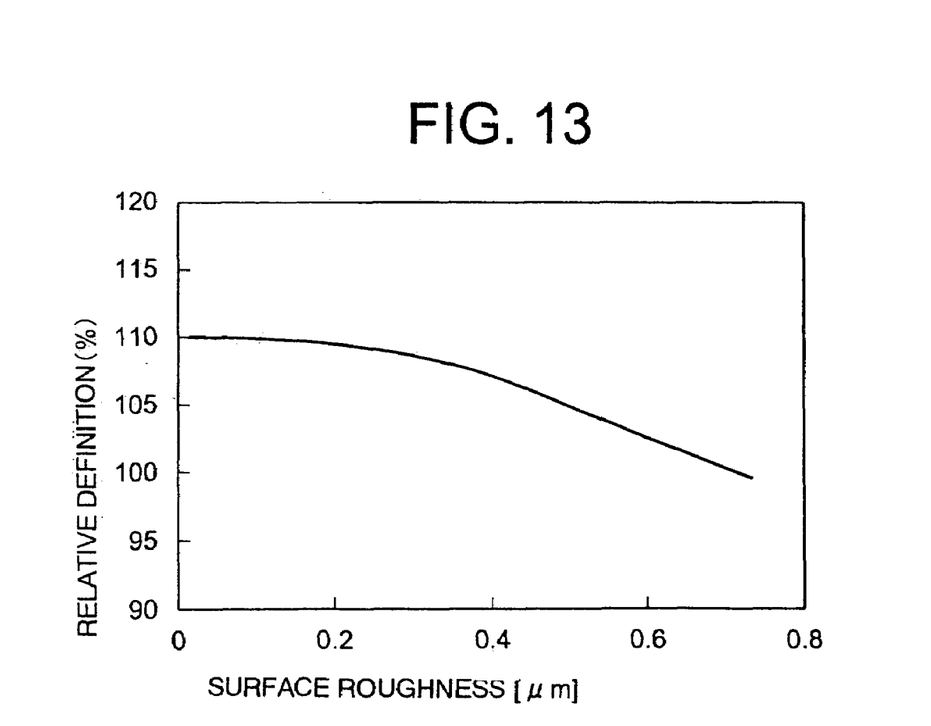
FIG. 13 is a diagram showing relationship between the surface roughness and definition of a phosphor sheet according to another example of the present invention.
Figure 14:
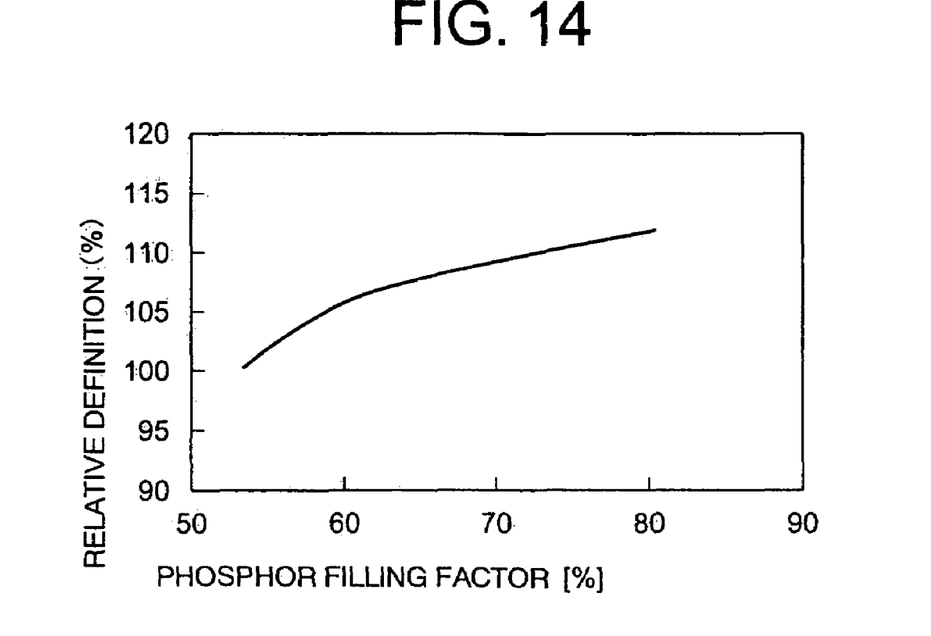
FIG. 14 is a diagram showing relationship between the phosphor filling factor and definition of a phosphor sheet according to another example of the present invention.

As is obvious from Table 4 and FIG. 13, the definition of the X-ray image can be enhanced by setting the average roughness Ra of the surface of the phosphor layer at 0.5 μm or less. Concerning the phosphor filling factor of the phosphor layer, it is found out that the definition of the X-ray image is enhanced by setting the phosphor filling factor in the range of 60 to 80%.

EXAMPLES 14 AND 15, AND REFERENCE EXAMPLES 3 AND 4

The phosphor sheets were produced similarly to Example 9 except that the Gd$_2$O$_2$S: Eu phosphor of the average particle size of 2 μm (Example 14), the Gd$_2$O$_2$S: Eu phosphor of the average particle size of 15 μm (Example 15), the Gd$_2$O$_2$S: Eu phosphor of the average particle size of 1 μm (Reference Example 3), and the Gd$_2$O$_2$S: Eu phosphor of the average particle size of 25 μm (Reference Example 4) were used instead of the phosphor in example 9. The Eu concentration of each of the Gd$_2$O$_2$S: Eu phosphors is 0.5 mol %.

Figure 15:
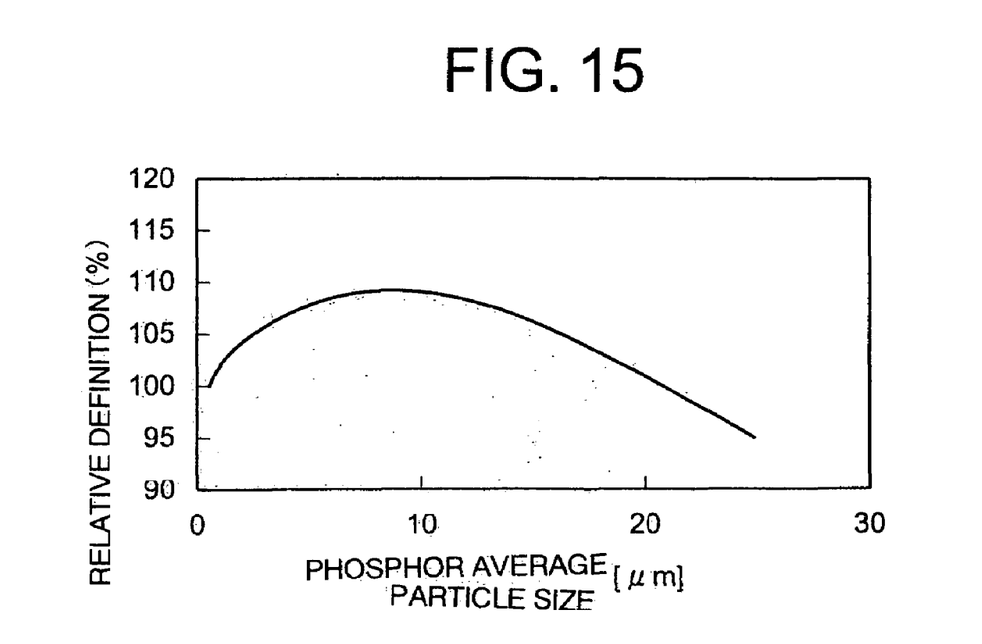
FIG. 15 is a diagram showing relationship between the average particle size of the phosphor particle and definition of a phosphor sheet according to another example of the present invention.

The sensitivity and the definition of each of these phosphor sheets were measured similarly to Example 9. The results are shown in Table 5. The sensitivities and definitions in Table 5 are the relative values when the measurement result of Reference Example 1 is set at 100. The relationship between the average particle size of the phosphor and definition is shown in FIG. 15.

TABLE 5

| | PHOSPHOR LAYER | | | | |
|---|---|---|---|---|---|
| | SURFACE ROUGHNESS Ra (μm) | PHOSPHOR FILLING FACTOR (%) | PHOSPHOR PARTICLE AVERAGE PARTICLE SIZE (μm) | RELATIVE SENSITIVITY | RELATIVE DEFINITION |
| EXAMPLE 9 | 0.28 | 69 | 8 | 101 | 109 |
| EXAMPLE 14 | 0.21 | 63 | 2 | 99 | 110 |
| EXAMPLE 15 | 0.36 | 60 | 15 | 100 | 105 |
| REFERENCE EXAMPLE 1 | 0.72 | 69 | 8 | 100 | 100 |
| REFERENCE EXAMPLE 3 | 0.18 | 60 | 1 | 93 | 100 |
| REFERENCE EXAMPLE 4 | 0.89 | 57 | 25 | 99 | 95 |

As is obvious from Table 5, in order to make the average roughness Ra of the surface of the phosphor layer at 0.5 μm or less, it is found out that it is preferable to set the average particle size of the phosphor in the range of 2 to 15 μm. By using the phosphor having such an average particle size, definition of the X-ray image can be enhanced.

In the above described examples 9 to 15, the case using Gd$_2$O$_2$S: Eu phosphor is explained, but it has been confirmed that the definition of the X-ray image is also enhanced by setting the average roughness Ra of the phosphor layer surface to be 0.5 μm or less in the phosphor sheets using other phosphors.

INDUSTRIAL APPLICABILITY

The first phosphor sheet for a radiation detector of the present invention is excellent in matching property with the photoelectric conversion film of the radiation detector, and therefore, it can enhance the detection sensitivity of radiation. The second phosphor sheet for the radiation detector is excellent in adhesiveness to the photoelectric conversion film of the radiation detector, and therefore, it can enhance the definition of the radiation image. These phosphor sheets are useful for the indirect conversion type radiation detectors. According to the radiation detector and the radiographic examination apparatus using such phosphor sheets, it is possible to obtain radiation image with high accuracy. This contributes to increase in examination information, enhancement in examination accuracy and the like in various kinds of radiography including radiography for medical diagnosis.

What is claimed is:

1. A radiation detector, comprising:
    a phosphor sheet configured to convert radiation rays transmitted through a specimen into light, wherein the phosphor sheet comprises:
    a support having a sheet shape, and
    a phosphor layer including a layer coated on said support with powder of a rare earth oxysulfide phosphor activated by europium of concentration in a range of 0.01 mol % to 3.5 mol %, wherein the rare earth oxysulfide phosphor powder has an average particle size in a range of 2 μm to 15 μm, wherein a filling factor of the phosphor powder in the phosphor layer is in a range of 60% to 80%, and the phosphor layer has a thickness in a range of 80 to 300 μm, and the rare earth oxysulfide phosphor has a composition expressed by:

general formula: $(R_{1-a}Eu_a)_2O_2S$, wherein, in the general formula, R is at least one kind of element selected from Gd, Lu, Y and La, and a is a number which satisfies $1\times10^{-4} \leq a \leq 3.5\times10^{-2}$);
    a photoelectric conversion film on which the phosphor layer of said phosphor sheet is integrally layered and bonded, and which converts the light from said phosphor sheet into electric charges, wherein the photoelectric conversion film comprises an amorphous silicon film or a single crystal silicon film; and
    a charge information reading section having a plurality of pixels arranged in an array form in contact with said photoelectric conversion film and reading out the electric charges generated on said photoelectric conversion film for each of the plurality of pixels as image signals of the radiation rays,
    wherein said phosphor layer has a surface bonded onto the photoelectric conversion film by an adhesive that transmits light, wherein the surface has a surface roughness of 0.5 μm or less in average roughness Ra, wherein the surface has been smoothed by a treatment using a metal roll or a metal plate.

2. A radiation detector according to claim 1,
    wherein each of the plurality of pixels comprises a pixel electrode, a charge storage capacitor storing the electric charges generated on said photoelectric conversion film via the pixel electrode, and a switching element provided corresponding to the charge storage capacitor, wherein the switching element reads out the electric charges.

3. An apparatus for radiographic examination, comprising:
    a radiation source irradiating radiation rays to a specimen; and a radiation detector according to claim 1 configured to detect the radiation rays transmitted through the specimen as image signals.

4. A radiation detector according to claim 1, wherein the phosphor layer is a slurry coated layer formed from a slurry that includes the powder of the rare earth oxysulfide phosphor activated by europium.

5. A radiation detector according to claim 4, wherein the slurry coated layer is a smoothed layer that has undergone a smoothing treatment after the slurry has been coated on the support so that the surface configured to be bonded onto the photoelectric conversion film has a surface roughness of 0.5 µm or less in average roughness Ra.

6. A radiation detector according to claim 1, wherein the europium concentration is in a range of 0.2 mol % to 1.6 mol %.

7. A radiation detector according to claim 1, wherein the average particle size of the rare earth oxysulfide phosphor powder is in the range of 6 µm to 10 µm.

* * * * *